(12) United States Patent
Daton-Lovett

(10) Patent No.: US 10,100,951 B2
(45) Date of Patent: *Oct. 16, 2018

(54) COILABLE EXTENDIBLE MEMBER AND METHODS

(71) Applicant: RTL Materials Ltd., Lymington Hampshire (GB)

(72) Inventor: Andrew James Daton-Lovett, Lymington Hampshire (GB)

(73) Assignee: RTL Materials Ltd., Lymington Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,753

(22) Filed: Jan. 23, 2017

(65) Prior Publication Data

US 2017/0130875 A1    May 11, 2017

Related U.S. Application Data

(63) Continuation of application No. 14/124,531, filed as application No. PCT/GB2012/051316 on Jun. 11, 2012, now Pat. No. 9,562,630.

(30) Foreign Application Priority Data

Jun. 9, 2011 (GB) .................................. 1109625.2

(51) Int. Cl.
*F16L 11/00* (2006.01)
*F16L 9/02* (2006.01)
(Continued)

(52) U.S. Cl.
CPC ................ *F16L 9/02* (2013.01); *B21D 53/00* (2013.01); *B64G 1/222* (2013.01); *E04C 3/005* (2013.01);
(Continued)

(58) Field of Classification Search
CPC .................................. F16L 9/02; E04C 3/005
(Continued)

(56) References Cited

U.S. PATENT DOCUMENTS 2,325,616 A * 7/1943 Landweber .............. B63G 8/42
114/221 R
3,279,500 A * 10/1966 Feder ........................ F16L 1/11
138/110

(Continued)

FOREIGN PATENT DOCUMENTS

EP        0 319 921 A2    6/1989
WO       99/62812 A1    12/1999

OTHER PUBLICATIONS

Iqbal K. et al., "Deployable composite slit tubes," IUTAM-IASS Symposium on Deployable Structures: Theory and Applications, Sep. 9, 1998, p. 153.
(Continued)

*Primary Examiner* — James Hook
(74) *Attorney, Agent, or Firm* — Pepper Hamilton LLP

(57) ABSTRACT

The invention provides an extendible member (10) which is configurable between a coiled form (11) and an extended form (12). The extendible member (10) comprises: a primary member (14) comprising a sheet of material resiliently biased in a slit tube form, wherein the slit tube can be opened out at the slit to assume an open form in which it has a flattened cross section; at least one resilient secondary member (15) having first and second connections to the primary member (14) at respective different circumferential positions on the primary member (14), wherein in the extended form, the primary member (14) is in its slit tube form and the resiliency of the secondary member (15) causes at least part of the secondary member (15) to displace towards the slit in the primary member (14) to provide torsional and axial stiffness to the primary member (14), and
(Continued)

wherein in the coiled form (11), the primary member (14) is in its open form and the secondary member (15) conforms to the flattened cross section of the primary member (149) so that primary and secondary member can be co-coiled. Corresponding methods are also provided.

20 Claims, 5 Drawing Sheets

(51) Int. Cl.
  *B64G 1/22* (2006.01)
  *E04C 3/00* (2006.01)
  *F16H 19/06* (2006.01)
  *B21D 53/00* (2006.01)
  *H01Q 1/12* (2006.01)
  *E04C 3/28* (2006.01)

(52) U.S. Cl.
  CPC ..... *F16H 19/064* (2013.01); *B65H 2701/332* (2013.01); *B65H 2701/371* (2013.01); *E04C 3/28* (2013.01); *H01Q 1/1235* (2013.01); *Y10T 29/49609* (2015.01)

(58) Field of Classification Search
  USPC .................. 138/128, 119, 115, 116, 108
  See application file for complete search history.

(56) References Cited

U.S. PATENT DOCUMENTS

| | | | |
|---|---|---|---|
| 3,300,910 A | 1/1967 | Isaac | |
| 3,387,414 A | 6/1968 | Adams | |
| 3,434,674 A * | 3/1969 | Groskopfs | B64G 9/00 242/390.2 |
| 3,508,587 A | 4/1970 | Mauch | |
| 3,735,943 A | 5/1973 | Fayet | |
| 4,018,397 A | 4/1977 | Rusch et al. | |
| 4,197,264 A | 4/1980 | Degg | |
| 4,225,871 A | 9/1980 | Ramari | |
| 4,265,690 A | 5/1981 | Lowenhar | |
| 4,991,784 A | 2/1991 | Schmid | |
| 5,122,401 A | 6/1992 | Finkelstein | |
| 5,746,255 A | 5/1998 | Walsh et al. | |
| 6,256,938 B1 * | 7/2001 | Daton-Lovett | F16H 19/064 138/119 |
| 6,602,574 B1 | 8/2003 | Daton-Lovett | |
| 9,562,630 B2 * | 2/2017 | Daton-Lovett | B64G 1/222 |
| 2002/0195155 A1 | 12/2002 | Debaisieux | |
| 2005/0183279 A1 | 8/2005 | Wheaton | |
| 2016/0010333 A1 | 1/2016 | Freebury et al. | |
| 2016/0052225 A1 | 2/2016 | Francis et al. | |

OTHER PUBLICATIONS

Rimrott, F. P. J., "Stem Shells," Banff, Sep. 3, 2003, pp. 151-186.
International Search Report dated Nov. 7, 2012 in corresponding International Patent Application No. PCT/GB2012/051316.
Great Britain Search Report dated Oct. 11, 2012 in corresponding British Patent Application No. GB1109625.2.

* cited by examiner

COILABLE EXTENDIBLE MEMBER AND METHODS

This application is a continuation of U.S. patent application Ser. No. 14/124,531, filed Apr. 25, 2014, which is a national phase filing under 35 U.S.C. § 371 of international application number PCT/GB2012/051316 filed on Jun. 11, 2012, which claims priority to GB 1109625.2 filed Jun. 9, 2011, each of which is incorporated herein by reference in its entirety.

The present invention relates to an extendible member which is configurable between a coiled form and an extended form, a method of manufacturing an extendible member which is configurable between a coiled form and an extended form, a method of deploying an extendible member, and a method of providing a conduit.

Slit Tubular Extendible Members (STEMs) (or sometimes "Storable Tubular Extendible Members") are devices which comprise of a strip of a resilient material, formed into a curved section that may or may not overlap, thus forming a wholly or partially tubular structure and which can be coiled along an axis substantially normal to the tube axis for storage or transport or as a means of linear actuation. They are essentially developments of the carpenter's metal tape measure in which the characteristic slight curvature of such a tape measure is increased to subtend a greater angle towards a more fully tubular section. They are generally manufactured from thin ribbons of stainless steel or beryllium copper. Such members will hereafter be referred to as "simple STEMs".

A further class of STEMs are described in "Iqbal K., Pellegrino S. and Daton-Lovett A. J. (1998) (Deployable Composite Slit Tubes" Proceedings of the IUTAMIASS Symposium on Deployable Structures, Cambridge, UK, 6-9 September). These STEMs, generally known to practitioners of the art as Bistable Reeled Composites (BRCs) differ from the other classes in having the engineering constants, particularly the Poisson's Ratio and Isotropy of the materials from which they are manufactured, engineered in such a manner as to cause them to spontaneously form into a coil as the primary curve is straightened. They are usually engineered in such a manner as to cause both the extended and coiled forms to be stable, removing the need for constraining the coiled form for storage, transport, etc. They also possess the significant advantage over "simple" STEMS of being able to be manufactured with significantly higher thickness to radius-of-curvature ratios, significantly increasing their torsional rigidity. Unlike simple STEMs, the manipulation of the local engineering constants of BRCs allows the production of STEMs which are not circular or smoothly curved in section and which may extend to form simple or complex curved members, in addition to the classic straight extension of the simple STEM. FIG. 1 shows the typical form of such devices.

STEMs exhibit weaknesses in torsional and bending rigidity in comparison to an Euler tube as a result of the slit nature of their construction. The lack of stiffness in bending can be compensated for by overlapping a portion of the sides of the member when extended. Once a certain degree of overlap is achieved the extended structure will become inertially balanced (Rimrott F. P. J. (1995) "Stem Shells" Peter E Glockner, Fetschrift, Calgary, Canada). This scheme has, however, the drawback of increasing the peak strain in the member during coiling, which leads to a reduction in the achievable thickness to radius-of-curvature ratio and reducing the cycle life of the device. This drawback is particularly significant in BRCs because they typically have higher thickness to radius-of-curvature ratios, and thus they have higher peak strains during coiling. This scheme also means that the width of the member when coiled is increased. This has the disadvantage of reducing the extended volume to pack volume ratio, which is the main advantage of such devices.

Such overlapping has, however, no significant effect on the poor torsional rigidity of STEMs. A number of mechanisms have been devised to compensate for this lack of torsional rigidity. The most common of these are the castellation of the STEM edges in such a manner as to allow the castellations to interlock on extension. Alternatively, it has been proposed to use protruding tabs from one edge of the stem which interlock on extension with holes provided in the face of the stem. The first of these mechanisms precludes the extensive overlapping needed to produce inertial balance in the STEM. Whilst the second allows substantial overlapping both increase the complexity of the device and introduce stress concentrations which reduce its cycle life. They also require guidance mechanisms to ensure interlocking, increasing the size and weight of the completed mechanism and introducing further possibilities for failure.

The zip mechanism does not work very well because it has low torsional stiffness. The zip permits small amounts of relative axial slip between the edges, which lead to a secondary failure mode.

A further attempt to provide a coilable member having increased torsional stiffness was produced by DLR (German Aerospace Centre). In this design, the member 100 has a lenticular cross section when extended, as shown by FIG. 2A. The member 100 is stable in this form and has no residual stresses in this form. The member 100 is forced flat to allow it to be coiled, as shown by FIG. 2B. To make the member 100, two semi-lenticular members 101,102 are formed from Carbon Fiber Reinforced Plastic. The opposed edges 103 of these members 101,102 are in the same plane. The members 101,102 are placed back to back, so that the edges 103 abut each other, and these are then bonded 104 together to form the member. A disadvantage of this member is that the lenticular shape is fundamentally not as strong as a Euler tube shaped member. These structures have been deployed primarily in space-exploration applications where they are not expected to bear significant axial stresses/strains. Another disadvantage of this arrangement is that the member has a high degree of residual stress when coiled. The path length differences of the two members 101,102 are prone to produce bucking, which shortens the life of the member.

According to a first aspect of the present invention, there is provided an extendible member which is configurable between a coiled form and an extended form, comprising:

a primary member comprising a sheet of material resiliently biased in a slit tube form, wherein the slit tube can be opened out at the slit to assume an open form in which it has a flattened cross section;

at least one resilient secondary member having first and second connections to the primary member at respective different circumferential positions on the primary member, wherein in the extended form, the primary member is in its slit tube form and the resiliency of the secondary member causes at least part of the secondary member to displace towards the slit in the primary member to provide torsional and axial stiffness to the primary member, and wherein in the coiled form, the primary member is in its open form and the secondary member conforms to the flattened cross section of the primary member so that primary and secondary member can be co-coiled.

A normal slit tube is significantly weakened by the fact that a slit extends along its length allowing the two edges forming the slit to move relative to each other. The present invention addresses this problem by providing a secondary member to provide torsional and axial stiffness to the primary member, thus providing a stronger STEM. The arrangement of the primary and secondary member is such that the extendible member is still capable of being coiled, which the advantages this presents in being able to stow the member is a more compact form, etc. The two connections between the secondary member and the primary member being at different circumferential positions (when the primary member is in tubular form) and the displacement of some or all of the secondary member towards the slit means that the secondary member acts as a bridge between the sides of the primary member, preferably closely spanning the slit, thereby bracing the primary member and providing torsional and axial stiffness. The secondary member is preferably resiliently biased in a curved form to displace towards the slit when the primary member assumes its tubular form.

The connections between the primary and secondary member preferable run the length of the secondary member and are preferably at the two edges of the secondary member.

In an embodiment, the primary member has a smooth curve in cross section, i.e. it has no discontinuities in its curvature around its perimeter (other than the slit) and in some preferred embodiments it does not have inflections in its curvature. For example, the tube may be generally circular, oval, elliptical, ovoid, or any of these with locally flattened portions, such as a cartouche shape. Preferably the tube subtends angle of at least 180 degrees, and more preferably at least 270 degrees. In preferred embodiments, the slit subtends a relatively small angle and the tube is close to being closed, e.g. tube subtends an angle of between 330 degrees and 360 degrees. In some preferred embodiment, the tube can subtend an angle of more than 360 degrees where the edges of the primary member defining the slit overlap each other.

In principle, almost any angle can be subtended by the primary member. Whatever angle is used, it is generally preferably that the primary member is significantly stronger along the axis than the secondary member, as the secondary member has to extend/compress relative to the primary member as it extends/coils; and also that the primary member is highly isotropic, having an axial modulus substantially higher than its 45 degree modulus, which is the modulus that governs torsional stiffness, which aids form a strong structure.

Preferably the connections to the secondary member are inside the primary member, such that edges of the primary member extend circumferentially beyond the connections.

The primary and secondary members are generally "thin" allowing them to be more easily coiled together, with the secondary member lying in the interstices of the coils of the primary member. The edges of the primary member, which extend generally in the direction of the extension of the member, either overlap, meet or leave a gap, thereby forming a slit in the tube. The edges are preferably straight and parallel. The connections of the secondary member to the primary member are preferably parallel to each other and extend along the secondary member in the extension direction.

Preferably the member is reversibly configurable between the coiled and the extended form.

In an embodiment, the extendible member is progressively transformable from the coiled form to the extended form. This allows the member to be progressively extended from its coiled form to the desired length.

In an embodiment, the width of the primary member and of the secondary member between the first and second connections is the same. This helps the primary and secondary members lie flat against each other, and aids coiling.

In an embodiment the secondary member is connected to the inner surface of the primary member.

In an embodiment, the secondary member has at least one portion having substantially no residual axial force when extended and having a significantly higher axial compressibility than that of the primary member, such as to allow it to tolerate the strain derived from the path difference incurred by coiling without failure.

In an embodiment the secondary member has at least one portion having substantially no residual axial force when coiled and having a significantly higher axial elasticity than the primary member, such as to allow it to tolerate the strain derived from the path difference incurred by being extended without failure.

In an embodiment, the secondary member has at least one section having substantially no residual axial force when having a radius of curvature that is between its coiled and its extended states, the secondary member having a high axial compressibility and/or a high axial elasticity.

In an embodiment, the secondary member exerts a net force on the primary member through the connection points when the extendible member is extended, and the connection points are positioned on or close to the inertial axis of the primary member such that the moments acting on the extended member are balanced to prevent bending of the member.

If you put a connection that is loaded, for example, in tension when extended and this is not at the inertial center of the extended STEM (which, due to the slit, will not lie along the geometrical axis of the STEM unless it has a large overlap) then the tensile forces will tend to force the STEM into a curve. By moving the points of attachment to the inertial, rather than the geometric, center of the STEM, you can balance this tensile force so that it does not exert a net moment along the axis of the STEM. So the STEM comes out straight.

In an embodiment, the secondary member exerts a net force on the primary member through the connection points when the extendible member is extended, and the connection points are offset from the inertial axis of the slit tube member such that a net moment acts on the member to achieve a predetermined bending of the member.

By deliberately moving the points of attachment away from the inertial center, you can make the STEM extend with a net tensile load running to one side or the other of the inertial center and thus make it curved when extended. For the compressive loading case, the points of attachment are moved the other way.

In an embodiment, the member comprises a plurality of secondary members coupled in a plurality of sections along the length of the primary member. The gaps formed between the sections of secondary member allow the net strains on the secondary member to be relieved in the gaps to prevent buckling of the secondary member when coiled. The secondary member still needs to be in long enough sections to provide torsional and axial stiffness to the tube. This will depend to some degree on the form of the tube and the application. In preferred embodiments, the lengths of the sections are at least the maximum diameter of primary member and more preferably twice the maximum diameter of primary member. In preferred embodiments, the lengths of the sections are at least the length of 360 degrees of the member when coiled at tightest radius.

In an embodiment, proceeding along the length of the secondary member, the secondary member has portions of relatively higher axial flexibility and relatively lower axial flexibility. The portions of lower axial flexibility allow the strains experienced by the secondary member to be dissipated in these portions without buckling, whilst the stiffer portions of the secondary member contribute more to the bracing effect on the primary member.

In an embodiment, the secondary member has natural tendency to coil. This gives another technique for co-coiling the primary and secondary member without buckling of the secondary member.

In an embodiment, the primary member is bistable having a first bistable state in the extended tubular form and a second bistable state in the coiled form. This allows the extendible member to be stable in the coiled and the extended states so that less energy is stored in the coiled member and the forces needed to keep the member coiled are reduced or eliminated.

In an embodiment, the secondary member is bistable in the extended and coiled form. The secondary member being bistable also allows less energy to be stored in the coiled member.

In an embodiment, one or all connections between the primary member and the secondary member comprises a hinge or a resilient flexible portion. Generally, the more flexible the hinge, the smaller small radius of curvature can be made between the primary member and secondary member, which is preferably where it is desired to make the secondary member can lie close to the primary member when extended, which provides high torsional stability to the member. However, this arrangement leads to higher strains on the hinge area. In some embodiments therefore, it may be desired to have a higher radius of curvature to reduce the strain and increase the operational life span of the member.

In an embodiment, one or all connections between the secondary member and the primary member is by a resilient flexible portion formed separately or integrally with the secondary member.

According to a second aspect of the present invention, there is provided a method of manufacturing an extendible member which is configurable between a coiled form and an extended form, comprising:
  connecting at least one resilient secondary member to a primary member at first and second different circumferential positions on the primary member,
  wherein the primary member comprising a sheet of material resiliently biased in a slit tube form, wherein the slit tube can be opened out at the slit to assume an open form in which it has a flattened cross section;
  wherein in the extended form, the primary member is in its slit tube form and the resiliency of the secondary member causes at least part of the secondary member to displace towards the slit in the primary member to provide torsional and axial stiffness to the primary member, and
  wherein in the coiled form, the primary member is in its open form and the secondary member conforms to the flattened cross section of the primary member so that primary and secondary member can be co-coiled.

In an embodiment, the interstitial space between the first and second members is sealed along some or all of the length of the member and has an opening by which fluid pressure can be supplied to the sealed interstitial space.

According to a third aspect of the present invention, there is provided a method of deploying an extendible member as described above, the method comprising applying fluid pressure to the opening to cause fluid to enter the sealed interstitial space such as to cause the extendible member to extend.

This provides a simple and convenient way of extending the member by applying fluid pressure, e.g. by applying a gas or a liquid to the opening, to the interstitial space formed between the primary and secondary members. The sealed interstitial space forms a "pocket", which is caused to "inflate" by the fluid pressure into its tubular form and thereby to extend the member.

Preferably, the interstitial space between the first and second members is sealed along some or all of the length of the member and has first and second openings at different positions along the length of the member.

According to a fourth aspect of the present invention, there is provided a method of providing a conduit, the method comprising: extending an extendible member as described above such that a conduit is formed between the first and second openings by which a material can be channeled between the first and second openings.

This provides a convenient method of delivering a material. The material may be in principle any fluid, i.e. a liquid or gas supplied under pressure to the first opening, or a flowable material, such as a particulate material, or other suitable material.

It will be appreciated that any features expressed herein as being provided "in one example" or as being "preferable" may be provided in combination with any one or more other such features together with any one or more of the aspects of the present invention Embodiments of the present invention will now be described by way of example with reference to the accompanying drawings, in which.

Figure 3:
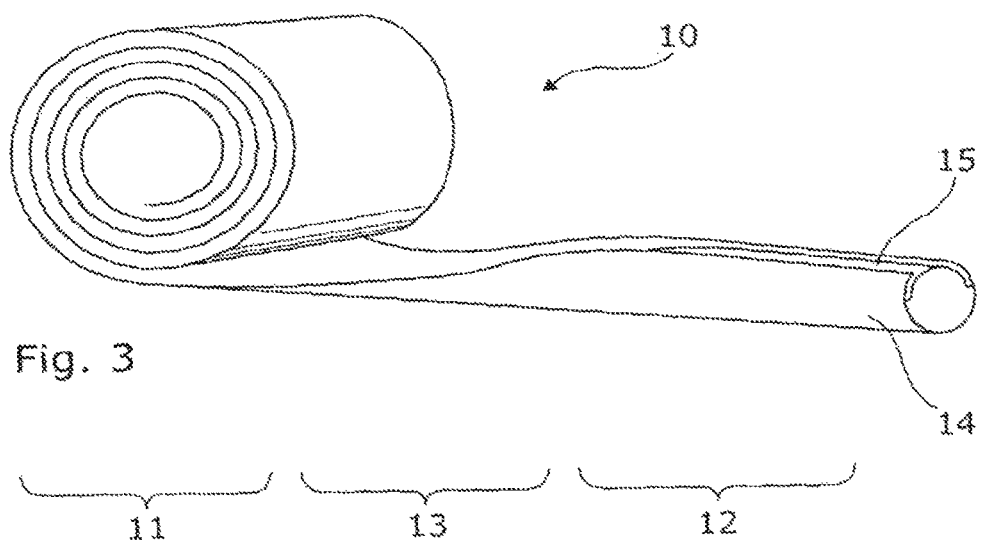
FIG. 3 shows an example of an extendible member according to an embodiment of the present invention.

FIG. 3 shows an example of an extendible member 10 according to an embodiment of the present invention. The extendible member 10 comprises a coiled portion 11, an extended portion 12, and a transition portion 13 where the member 10 undergoes the transition from its coiled form 11 to its extended form 12. The member 10 comprises a primary member 14 coupled continuously or intermittently along its length to one or more secondary members 15.

The primary member 14 comprises a sheet of material resiliently biased to form a slit tube. The extended member has the form of a tube with a slit extending axially along its length which allows the primary member to be opened out at the slit into a flat form for coiling.

The primary member 14 can be made for example from sheet metal or a composite structure. Preferably the primary member 14 is made from a tough resilient sheet in order to guard against damage. In a preferred embodiment, the primary member is formed from a bistable material so that it has a stable form when extended and when coiled and so less force is needed to keep the member 10 in the coiled form.

Figure 1:
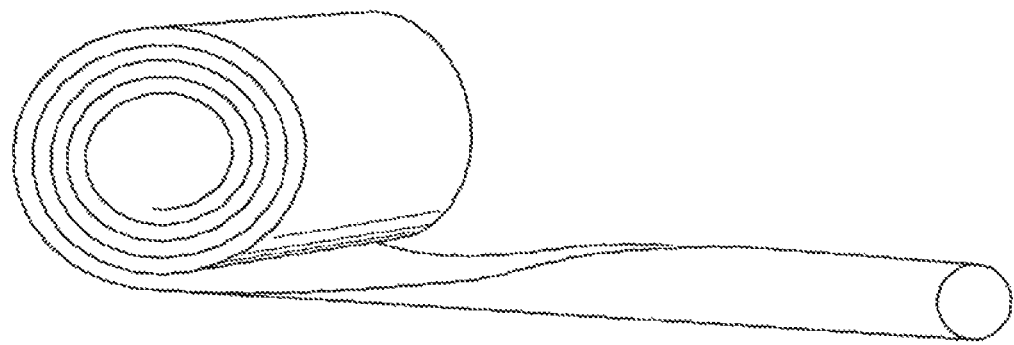
FIG. 1 shows an example of a coiled extendible member.
Figure 4A:
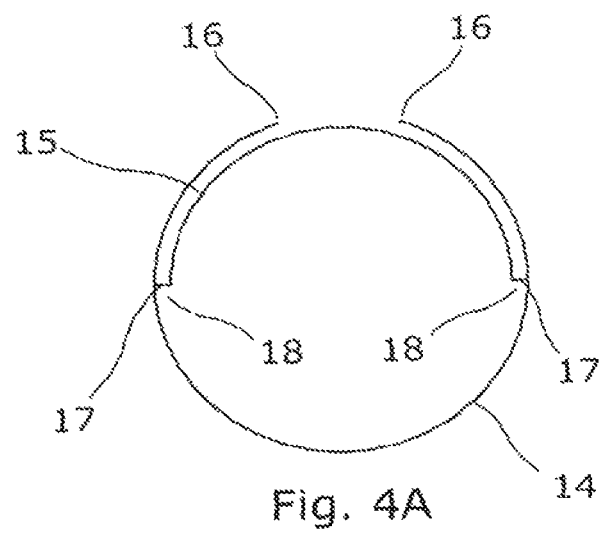
FIG. 4A shows in cross section an extended part of an example of a coilable extendable member according to an embodiment of the present invention.

In the present example, as shown most clearly by FIG. 4A, the cross section of the primary member 14 when extended is generally circular and the edges 16 of the primary member 14 do not meet, meaning that the cross section has a gap in it. However, as the skilled person will appreciate in the light of the present disclosure, primary member 14 may have a cross section other than a circle, and may have a cross section where the edges "close", e.g. to form a full circle, or overlap, i.e. where the member subtends an angle more than 360 degree.

In order to reinforce the primary member 14 in torsion, one or more secondary members 15 are provided to couple the two sides of the primary member 14 in some way to "close" the member to form a unitary hollow member, examples of which are given in the following description.

Figure 4B:
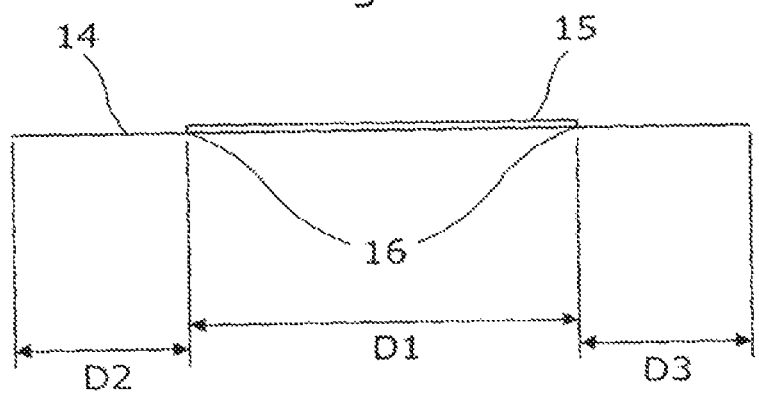
FIG. 4B shows in cross section a coiled part of an example of a coilable extendable member according to an embodiment of the present invention.
Figure 2A:
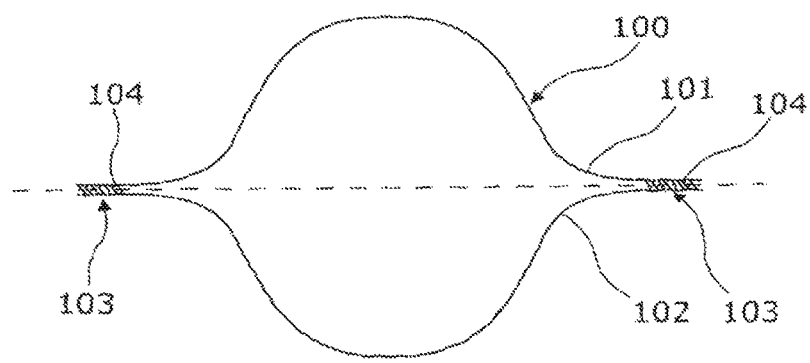
FIGS. 2A and 2B show in cross section an extended part and a coiled part respectively of a prior art extendible member.
Figure 2B:
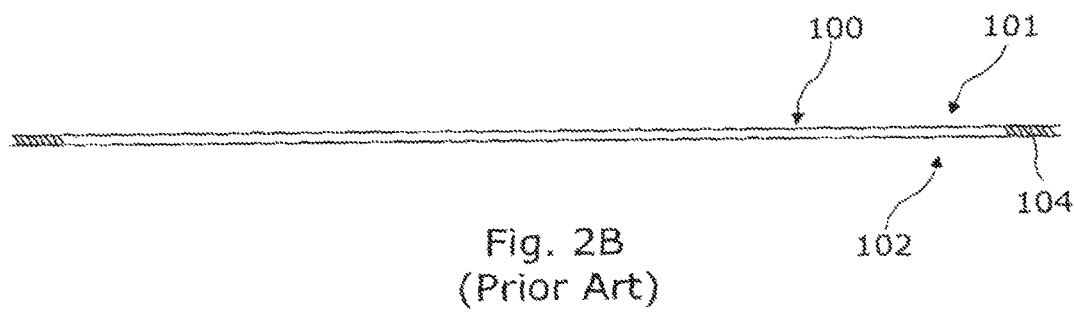

As shown most clearly by the cross sectional views of FIGS. 4A and 4B, the or each secondary member 14,15 is joined to the primary member 14 at two circumferential attachment points 17 (when viewed in cross section). The secondary member 15 has a resiliently curved portion. The secondary member 15 is attached to the primary member 14 by two hinge mechanisms 17 which allow the secondary member 15 to hinge relative to the primary member 14 along the axis of the primary member 14. When the member 10 is extended, the primary member 14 forms a slit tube and the secondary member 15 displaces towards the slit, curved surface of the primary member 14. Thereby the secondary member 15 "bridges" the slit of said primary member 14 forming a "unitary hollow member". When not deployed, the primary member 14 is opened out flat at the slit and the hinges 17 allow the secondary member 15 to lie flat against the primary member 14 and thus to be co-coiled with said primary member 14.

To allow the secondary member 15 to displace towards the slit in the primary member 14 when extended and lie flat against the primary member when coiled, some form of flexible coupling is provided between the primary and secondary member. As described, hinge mechanisms 17 or alternatively flexible strips can be used. This allows the secondary member 15 to hinge relative to the primary member 14 and achieve a low radius of curvature allowing the secondary member 15 to lie close to the open portion of the primary member 14. This gives good torsional stiffness to the member 10. However, this arrangement can lead to high stresses and strains acting on the hinge area, which can reduce the operational life of the member 10. The hinge mechanisms 17 or flexible strips may be formed integrally with the secondary member or can be provided separately.

Returning to the example of FIGS. 4A and 4B, the hinge points 17 are located on the inner surface of the primary member 14 at points which are approximately 180 degrees apart on the primary member 14 and equidistant from the slit. To allow the member 10 to open out into a flat form easily, the distance between the hinges 17 of the secondary member 15 when flat should be approximately the same as the distance between the hinges on the primary member 14 when flat. This distance is shown by D1 is FIG. 4B. The portions of the primary member 14 which extend beyond the hinge points 17 have widths D2 and D3. In this example, D2=D3. However, as described in more detail below, the position of hinges points can be varied as desired.

Figure 7:
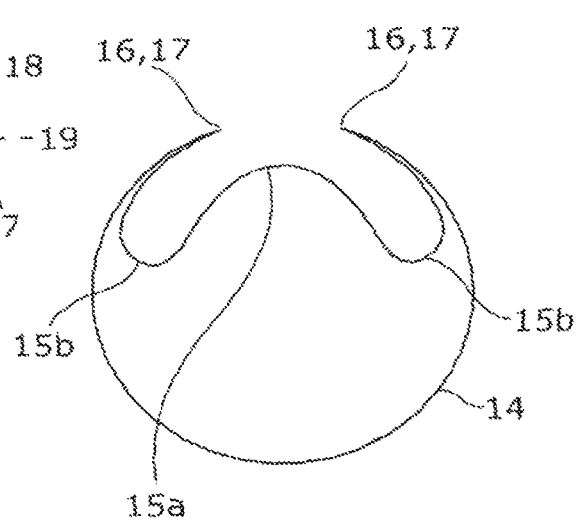
FIG. 7 shows in cross section an extended part of a yet another example of a member according to an embodiment of the present invention.

FIG. 7 shows another example of an extendible member 10 having a different arrangement of the secondary member 15 to that of FIGS. 4A and 4B. In the example of FIG. 7, the secondary member 15 is attached to the primary member close to the edges 16 of the primary member 14. Again, the width of the primary member 14 between the connection points (D1) and the width of the secondary member 15 between the connection points are equal to allow the secondary member 15 to lie flat against the primary member 14 when coiled. In order for the curved portion 15a secondary member to displace towards the slit, the secondary member has resilient portions 15b between the curved portion 15a and the hinges 17 which can flex in the opposite direction to the curved portion 15a. These portions have a higher radius of curvature and therefore the curved portion 15a does not lie as close to the primary member 14. However, this also means that the stresses and strains acting in the hinge area and on the resilient portions 15b are lower, which helps prolong the working life of the member 10. Indeed, if desired, the hinges 17 can be omitted entirely and the resilient portions 15b alone can be used to allow the curved portion 15a to displace. This may simplify construction by allowing the edge portions of the secondary member to be adhered or otherwise fixed against the edge portions of the primary member, thereby strengthening the edge portions of the primary member 14 proximate the slit.

Figure 5:
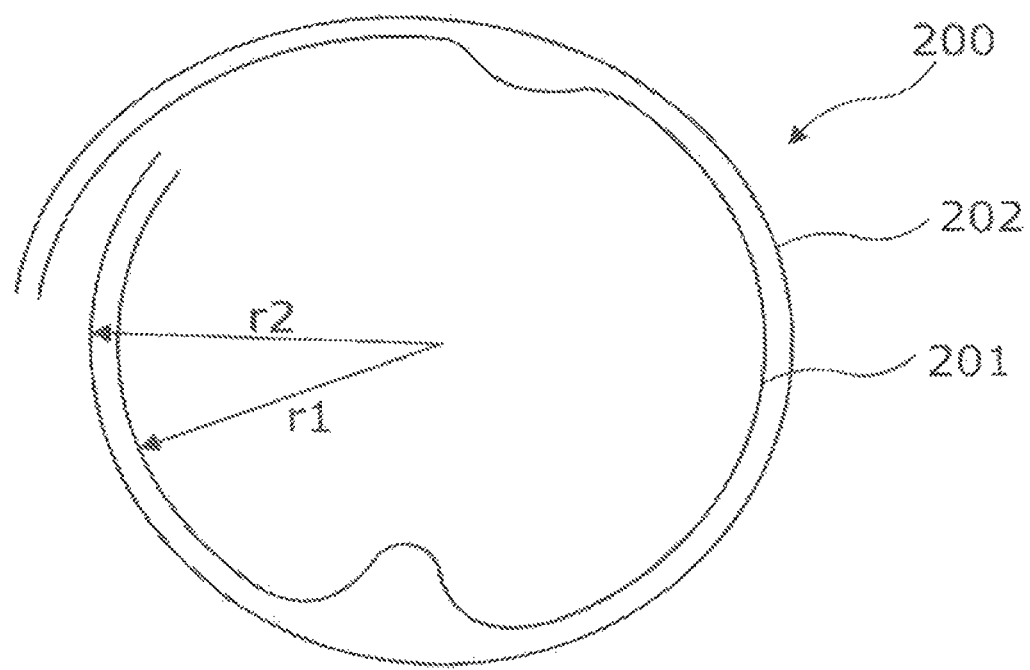
FIG. 5 shows an example of how buckling might occur in an extendible member.

An important factor in the construction of the extendible member 10 is to allow the extendible member 10 to coil without the path difference between the primary member 14 and the secondary member 15 causing buckling of either member 14,15 which might cause damage or reduce the life span of the extendible member 10. An example of how buckling might typically occur is shown by FIG. 5, which shows a cross section along the longitudinal axis of a coiled section of a member 200 comprising an inner member 201 and an outer member 202, where the radius of curvature (r1) of the inner member 201 is smaller than the radius of curvature (r2) of the outer member 202, with the result that the inner member 201 is forced to buckle to compensate for the its shorter path length. At the same time as preventing buckling, the member 200 must exhibit high enough modulus in hoop bending, or hoop torsion, or both to make a substantial contribution to the bending performance and/or torsional performance of the extendible member.

Examples are now described of ways in which the potential problem of buckling can be addressed.

One way to address buckling involves providing a continuous secondary member 15 engineered in such a manner as to have axial stiffness/modulus that is low enough to allow negation of the path difference when coiling and/or extending the member 10. That is, the secondary member 15 is made from a material the characteristics of which are engineered such as to provide the necessary relatively low axial compressive modulus and high axial compressive strain-to-break, or low axial tensile modulus and high axial compressive strain-to-break, or both (the choice of which depends on factors discussed below), whilst exhibiting a relatively high axial torsional and hoop modulus. "Strainto-break" is the amount of strain, as a percentage of its original length/width, to which a material can be subjected before it fails.

In engineering terms such materials possess a highly isotropic nature. Such characteristics in the secondary member 15 may be produced for example by the use of materials which exhibit these characteristics as a result of their molecular or crystalline structure, or by the use of Fiber Reinforced Composites (hereinafter referred to as FRPs), in which the position and orientation of the reinforcing fibers are such as to give rise to this type of isotropy, e.g. the fibers can be laid in a criss-cross pattern. Alternatively, a sheet of metal can be used which has holes punched in it to form a criss-cross pattern. Such techniques are known in the art per se, and are not discussed in detail herein. Other means to produce such isotropic materials may also prove suitable for the production of secondary members suitable for use in the production of the extendible member 10 described herein.

Another way to address buckling involves providing a continuous secondary member 15, made from a material the characteristics of which are engineered such as to intermittently vary along the axial length of said secondary member 15, such that areas of relatively high axial modulus and low axial strain-to-break are interspersed with areas of relatively low axial modulus and high axial strain-to-break, thus allowing the cumulative strain derived from the path difference between the members 14,15 to be relieved in those areas of relatively low axial modulus and high axial strain-to-break. This then allows the extendible member 10 to be coiled without path difference induced buckling taking place. Any suitable means may be utilized to achieve this end. Such means may include, but not be limited to, the provision of a secondary member 15 of intermittently varying thickness; intermittent variation in the reinforcing fiber lay, where the secondary member 15 is formed from an FRP; the production of a continuous secondary member 15 by the joining together of pieces of two or more materials of differing axial compressive properties; or axial tensile properties or both; or the combination of any of the above described techniques; or any other suitable means.

Figure 8:
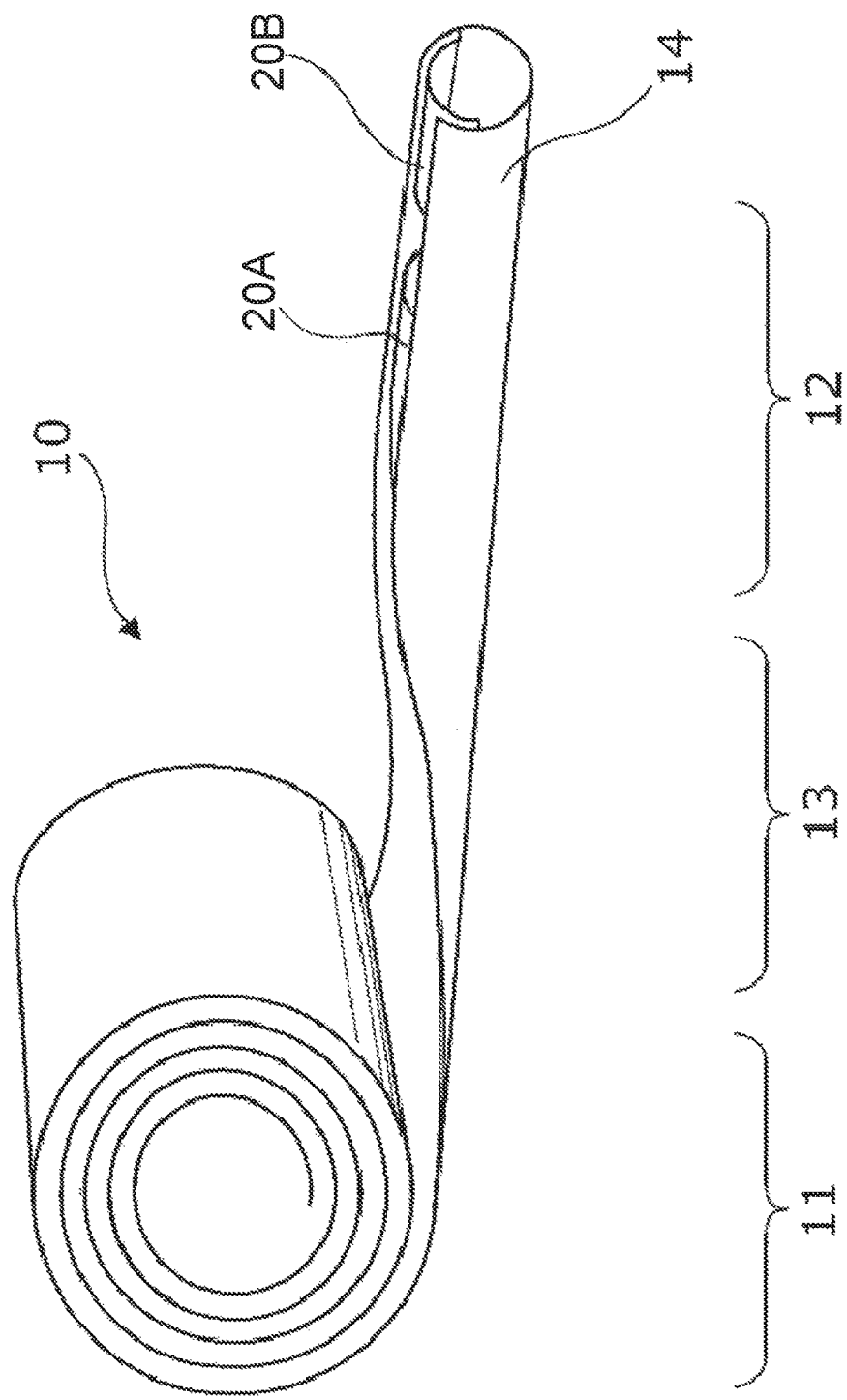
FIG. 8 shows an example of an extendible member including a plurality of secondary members according to an embodiment of the present invention.

FIG. 8 illustrates an example of an embodiment in which the secondary member includes a plurality of secondary members 20A and 20B which are separated by gaps along the axis of the primary member 14. The secondary members 20A and 20B are coupled to the primary member 14 at respective different longitudinal positions. This allows the cumulative, path difference derived strain to be relieved in the gaps, thus allowing the extendible member 10 to be coiled without path difference induced buckling taking place. However, it should be noted that the secondary member 15 needs to be provided in reasonably long lengths for an extendible member of a certain length to maintain the optimum torsional bracing effect.

If desired, these three techniques can be combined, e.g. providing several sections of secondary member having the characteristics noted in the first and second cases.

The secondary member or members 15 may be attached to the primary member in several ways.

A first technique can be used wherein the extendible member is substantially stress-free in the extended state. This may be accomplished for example by joining the two members 14,15 when in their extended or straightened form. In this case it is the axial compressive modulus of the secondary member 15 which must be engineered so as to allow coiling. In other words, the secondary member 15 has enough axial compressibility to compensate without buckling for the reduced path length it is forced to follow relative to the primary member 14 when it is made to coil.

A second technique can be used wherein the extendible member 10 is substantially stress-free at approximately the radius of the primary member 14 in the coiled state. This may be accomplished by coiling or locally bending the members 14,15 as they are joined. In this case it is the axial tensile modulus of the secondary member 15 which must be engineered such as to allow coiling. In other words, the secondary member 15 has enough axial "elasticity" to compensate without buckling for the increased path length it is forced to follow relative to the primary member 14 when it is made to extend. Preferably, the extendible member 10 is stress free at some point along its length in the coiled form, i.e. such as at the smallest functional radius when coiled where the stresses are potentially greatest due to the higher curvature. Even more preferably, the extendible member 10 is made to be stress free along most or all of its length by suitably varying the material properties of the second member 15 along its length (described in more detail below).

A third technique can be used wherein the extendible member 10 is stress free at some radius of curvature lying between the straight, extended state (case 1 above) and the radius of curvature of the coiled state (case 2 above). Again, this may be accomplished by locally bending the members 14,15 as they are joined. In this case both the axial compressive modulus and axial compressive strain-to-break and the axial tensile modulus and axial tensile strain-to-break of the secondary member 15 must be engineered such as to allow coiling. In other words, the secondary member 15 has enough axial compressibility to compensate without buckling for the different path length it is forced to assume relative to the primary member 14 when it is made to coil and the secondary member 15 has enough axial "elasticity" to compensate without buckling for the different path length it is forced to assume relative to the primary member 14 when it is made to extend.

As will be appreciated, the radius of the coiled primary member 14 will vary as the coil increases in size. So, if the joining is carried out at the radius of curvature which the STEM naturally forms when coiled (i.e. using the second joining technique) then this means that the STEM will develop some axial and coupling strain as the number of coils increases, even if there is no strain initially. The key is that the primary member 14 also increases its radius of curvature as the coil increases in size. Thus, the coupling strain is increasing with the size of the coil but remains minimal until the coil becomes very large with respect to its natural secondary radius. The same is true of the first technique too but with the senses reversed. The third technique is half-way between the first and second techniques, in which the neutral point will be somewhere between the smallest coil and the extended form.

If the length of the coil is known, rather than just making it as yard goods, then the radius of the coil can be varied at the point of attachment, such as to make the coupling strain zero (or constant +/−, or vary it in any other way as desired) at all points when coiled.

It is also contemplated to vary the axial compressive/tensile stiffness of the secondary member 15 along the length. In this way, the degree of compressibility/extensibility can be varied to match the local strain as the radius changes (the path difference decreasing as the local curvature gets larger).

When using the second and third techniques, the net forces on the secondary member 15 are tensile and the net forces on the primary member 14 are compressive when the member 10 is extended. The effect of this is that the connection, e.g. the hinge mechanism 17, between the primary and secondary members 14,15 produces is "loaded", i.e. there is a net force acting on the connection. This can produce a couple around the natural bending axis (or the inertial axis) of the member which has a tendency to bend the member 10 when extended. In many applications it will be desirable for the extended member 10 to be straight. It is therefore desirable to be able to control the effects of the couple in bending the member 10 when extended. To do this, the location of the hinge 17 can be positioned so the hinges lie on or close to the natural bending axis of the primary member 14 to produce a straight, inertially balanced, extendible member 10.

Figure 6:
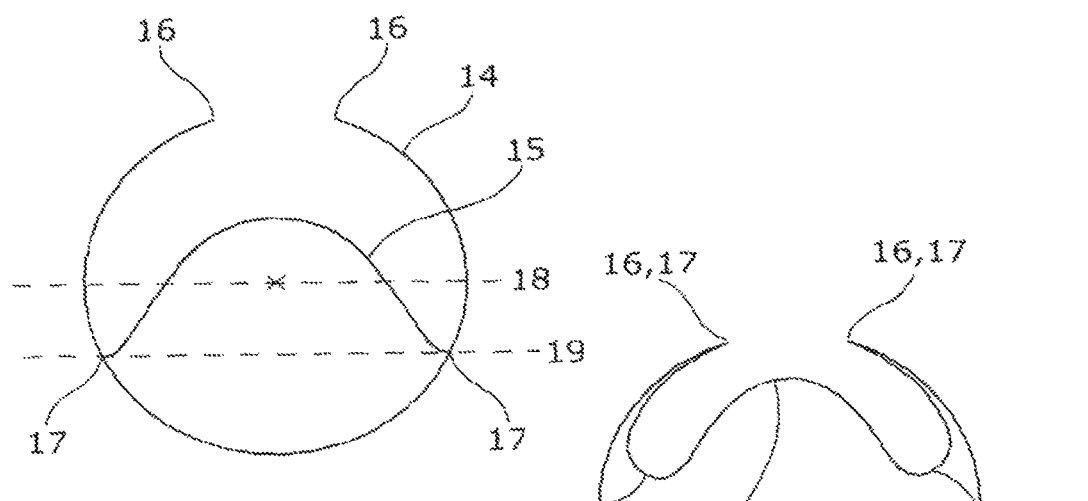
FIG. 6 shows in cross section an extended part of a further example of a member according to an embodiment of the present invention.

FIG. 6 shows an example for a member 10 having a circular cross section. For a complete circular cross section, i.e. without a slit in the tube, the natural bending axis will coincide approximately with the geometric axis 18 passing through the center of the circle. However, the presence of the slit in the tube weakens that side of the tube, meaning that the natural bending axis 19 (or inertial axis) is occurs further away from the slit. In order to prevent the net tensile or compressive force acting through the hinges 17 from creating a couple which would bend the member 10, the connection points 17 are positioned to be offset from the geometric axis 18 of the primary member, in the direction away from the slit, to be on or close to the natural bending axis 19.

Alternatively, in some applications it may be desirable to deliberately create a bent/arched extended member 10. This can be accomplished by positioning the hinge points 17 at appropriate places to deliberately create the couple necessary to bend the member as desired given the particular material properties of that member 10.

Thus, by appropriate positioning of the hinge points 17, it is possible to rebalance the net forces acting on the member 10 to control the form of the member 10 when extended.

Another way of engineering the secondary member 15 to coil with the primary member 14 is to provide a secondary member 15 which has a natural tendency to coil, i.e. with an inherent curve. This provides a strong tendency to coil naturally and this tends to force the secondary out towards the primary under compression, where buckling is inhibited by its presence acting as a constraint. This achieves much the same result as altering the tensile/compressive behavior, in a material that has a natural tendency to buckle away from the primary member, by slightly different means.

For example, a metal or pre-stressed secondary member 15 can be used, such as those use with so-called "wrist slapper" devices. These comprise a strip of metal with a natural tendency to coil having a crease is punched or otherwise formed along the middle of the member to form a localized "V" shape in cross section. This crease provides "hair-trigger" stability to the strip of metal when extended into a straightened form (i.e. it only takes a very slight force to make the wrist slapper coil). The member could also be achieved using composites. This allows co-coiling and bi-stability without axial strain coupling problems if the natural coiling radius of the secondary member is tight enough. The axial stiffness of the secondary member is high, but it wants the member to bend due to inherent curve. The mathematical solutions to allow this problem to be solved exist.

Yet another way to make the secondary member 15 coil with the primary member 14 without buckling is to make the secondary member 15 bistable, i.e. with negative Poisson coefficient. Materials with a negative Poisson's coefficient can allow the production of a secondary member 15 that automatically co-coils with the primary member 14 as a result of the same forces exploited in all bistable rollable members. If the material has a negative Poisson's coefficient, then when it is opened out along its primary axis and coiled, it will naturally coil so that the convex and concave faces are reversed, rather than preserved as in a positive Poisson's ratio material.

In the example of FIG. 7, the two resilient portions 15b have their radius of curvature in the same sense as the radius of curvature of the primary member 14. This means that the primary member 14 and the secondary member 15 will have a natural tendency to co-coil if their lay meets some of the primary conditions for bi-stability. Various techniques for placing lay (e.g. the orientation of reinforcing fibers in the various layer making up a material) to produce bistability are known in the art per se and are not discussed in detail herein.

These conditions apply if the material of the STEM possess a net Poisson's ratio sufficient to generate a secondary curvature at some angle to its primary axis of curvature when opened flat along this axis; and if this secondary curvature is of a large enough magnitude to give the STEM a curvature derived stiffness that is sufficient to prevent it bending back along its original axis of curvature whilst in the secondary curved form. These effects may be further modified by manipulation of the isotropy of the material. For example, a material that is stiff in compression along the axis of the secondary curvature will form a secondary curve that is smaller than that of one possessing the same net Poisson's ration that is stiff in compression and/or bending along the primary axis of curvature, as the Poisson derived forces will be amplified by the incompressibility of the material along the secondary axis. Although not always the case the optimum structure for most bi-stable members places the material with the highest Poisson's ratio towards the surface of the STEM, on one or both faces and places any material with lower Poisson's ratios and higher axial stiffness towards the neutral axis of bending of the plane of the material. This maximizes the Poisson's ratio derived effects leading to ease of rolling and/or true bi-stability and minimizes the local bending stiffness, whilst preserving the global stiffness of the extended STEM.

An important consideration of the manufacture of extendible members is to provide some means to reversibly or irreversibly, continuously or intermittently, couple the internal faces of the primary member to the external faces of the secondary member in areas of overlap between the two. Such coupling will further enhance the performance of the extendible member by delaying the onset of outward buckling of the slit edges of said primary member 14. Such means may include, but not be limited to, the use of Velcro, adhesives, welding techniques, rivets, screwing, bolting, stitching, pinning or any other means which may be found to be suitable for this purpose.

It may be desirable in some embodiments to reversibly or irreversibly, continuously or intermittently, couple the edges of the primary member 14 when extended. Such coupling will further enhance the performance of the extendible member by delaying the onset of outward buckling of the slit edges of said primary members 14. Such means may include, but not be limited to, the use of buckles, Velcro secured straps, zippers, adhesive tapes, mechanical latches or any other means which may be found to be suitable for this purpose.

It is of the nature of the present invention that a large number of embodiments may be realized thereof. These may utilize simple STEMs or BRCs or any combination thereof and may be produced from a wide variety of materials utilizing a large number of different production techniques. By way of illustration one such embodiment will now be described, together with a means of production thereof.

In a preferred embodiment, a bistable coilable composite (BRC) is used for the primary member 14. This may be manufactured, in the manner normal to practitioners of the art, such that its natural coiling radius is smaller than the desired coiling radius of the extendible member 10 to be produced by a factor such as to couple with the net compressive modulus of the secondary member 15 to which it is to be joined such as to produce an extendible member 10 of the desired final coiling radius. A curved secondary member 15, of external radius equal to the internal radius of the primary member 14 and of a flattened width half that of the internal circumference of the primary member 14 is manufactured from Fiber Reinforced Plastics in which the fibers lie in the hoop and at angles of plus and minus 45 degrees to the axis, thus giving rise to an member with low axial tensile and compressive modulus and high axial and compressive strain-to-break but with relatively high moduli in the hoop and torsional loading planes. A resilient membrane or membranes or a strip or strips of woven cloth is then bonded to the surface of the secondary member 15 such as to leave flaps along the edges of said secondary member 15. These flaps are then bonded to the inner surface of the primary member 14 along its axis such as to form an extendible member 10.

It is anticipated that the current invention will prove of utility in any are where it is desirable to provide structures which may be compacted for storage or transportation or where a means of high extension linear actuation is desired. Such applications may include, but not be limited to, the provision of robotic arms, masts for antennas or cameras or sensors or other devices, temporary or permanent structures such as buildings or bridges or any for other use where their characteristics may prove desirable.

The extendible member 10 may be deployed by any conventional means for deploying extendible members, e.g. by using a motorized spool to coil and/or uncoil the member, or simply deploying by hand.

In an embodiment, the interstitial space between the primary and secondary member can be sealed. This allows the member to be extended by putting a fluid, i.e. a gas or liquid, under pressure into the interstitial space formed between the primary and secondary members 14,15 via an opening into the space. The member may have a valve or some other suitable mechanical attachment points fixed at the opening to facilitate introducing the fluid. Thus, this provides a practical means of deployment of the member 10.

Having a sealed interstitial space between the members 14,15 with openings at different positions along the length of the space can provide a conduit which can have many potential uses. For example, this can be used for delivering a gas or fluid or some other material between the openings. The member may have valves or other suitable mechanical attachment points fixed to it at the openings to facilitate introducing the material. Thus, in an embodiment, the invention can provide a coilable, extendible conduit or pipe.

Embodiments of the present invention have been described with particular reference to the examples illustrated. However, it will be appreciated that variations and modifications may be made to the examples described within the scope of the present invention.

What is claimed is:

1. An extendible member which is configurable between a coiled form and an extended form, comprising:
    a primary member comprising a sheet of material resiliently biased to form a slit tube with a slit extending along its length, wherein the slit tube can be opened out at the slit to assume an open form in which it has a flattened cross section;
    a plurality of secondary members coupled at respective different longitudinal positions along the length of the primary member, each secondary member having first and second connections to the primary member at respective circumferential positions on the primary member,
    wherein in the extended form, the primary member is in its slit tube form and each secondary member is arranged such that at least part of the secondary member displaces towards the slit in the primary member, and
    wherein in the coiled form, the primary member is in its open form and the secondary members conform to the flattened cross section of the primary member so that the primary member and secondary members can be co-coiled.

2. An extendible member according to claim 1, wherein at least two secondary members are spaced apart along the length of the primary member so as to leave a gap between the at least two secondary members.

3. An extendible member according to claim 1, wherein the plurality of secondary members braces the primary member when in the extended form.

4. An extendible member according to claim 1, wherein a continuous portion of each secondary member curves towards and spans the slit to provide torsional and/or axial stiffness to the primary member when in the extended form.

5. An extendible member according to claim 1, wherein the axial length of at least one secondary member is at least a maximum diameter of primary member when extended.

6. An extendible member according to claim 1, wherein the primary member has longitudinal edges that define the slit in the extended form, and wherein the first and second connections of each secondary member to the primary member are at circumferential positions that are offset from the longitudinal edges of the primary member.

7. An extendible member according to claim 6, wherein each secondary member displaces towards the slit to as to lie close to the longitudinal edges of the primary member and closely span the slit in the primary member.

8. An extendible member according to claim 7, wherein each secondary member lies close to and follows the curvature of the primary member in the regions between the first and second connections and the respective longitudinal edges of the primary member.

9. An extendible member according to claim 8, wherein the cross section of the extendible member formed by the primary and secondary members is substantially circular.

10. An extendible member according to claim 9, wherein the extendible member is progressively transformable from the coiled form to the extended form.

11. An extendible member according to claim 9, wherein a width of the primary member and of at least one of the secondary members between the first and second connections is the same.

12. An extendible member according to claim 9, wherein at least one of the secondary members has a natural tendency to coil.

13. An extendible member according to claim 9, wherein at least one of:
  the primary member is bistable having a first bistable state in the extended form and a second bistable state in the coiled form; and
  at least one of the secondary members is bistable in the extended and coiled form.

14. An extendible member according to claim 9, wherein one or all connections between the primary member and at least one of the secondary members comprises a hinge or a resilient flexible portion.

15. An extendible member according to claim 9, wherein one or both of the first and second connections between at least one of the secondary members and the primary member is by a resilient flexible portion formed separately or integrally with the secondary member.

16. An extendible member which is configurable between a coiled form and an extended form, comprising:
  a first member comprising a sheet of material having a first stable form in which it is resiliently biased to form a longitudinal section of a tube defined by longitudinal edges, wherein the tube of the first member can be opened out at the edges to assume an open form in which it has a flattened cross section in which it can be coiled to assume a second stable form; and
  a second member comprising a sheet of material resiliently biased to form longitudinal sections of a tube defined by longitudinal edges, wherein the tube of the second member can be opened out at the edges to assume an open form in which it has a flattened cross section,
  wherein, in the extended form, the first and second members are in their forms as sections of a tube, with the second member coupled along the length of the first member, with the edges of the second member being coupled to the first member at respective first and second circumferential positions on the first member,
  wherein in the coiled form, the first member is in its open form and the second member conforms to the flattened cross section of the first member so that the first and the second members can be co-coiled, and
  wherein, in transitioning from the coiled form to the extended form, the edges of the second member hinge relative to the first member and the second member displaces away from the first member so as to form a closed section between the first and second member along the length of the member.

17. A member according to claim 16, wherein a flexible strip is used to provide a flexible hinge between the second member and the first member to allow the second member to displace away from the first member.

18. A member according to claim 17, wherein the flexible strip is provided separately from the second member.

19. A member according to claim 17, wherein the first member has a positive Poisson's ratio and the second member is bistable and has a negative Poisson's ratio.

20. A method of manufacturing an extendible member which is configurable between a coiled form and an extended form, comprising:
  coupling a plurality of secondary members at respective different longitudinal positions along the length of a primary member, wherein each secondary member is connecting to a primary member at first and second different circumferential positions on the primary member,
  wherein the primary member comprising a sheet of material resiliently biased in a slit tube form, wherein the slit tube can be opened out at the slit to assume an open form in which it has a flattened cross section;
  wherein in the extended form, the primary member is in its slit tube form and each secondary member is arranged such that at least part of that secondary member displaces towards the slit in the primary member, and
  wherein in the coiled form, the primary member is in its open form and the secondary members conform to the flattened cross section of the primary member so that the primary member and the secondary members can be co-coiled.

* * * * *